F. NIELSEN.
SHOCK ABSORBER.
APPLICATION FILED OCT. 15, 1910.
1,016,514.
Patented Feb. 6, 1912.
2 SHEETS—SHEET 2.
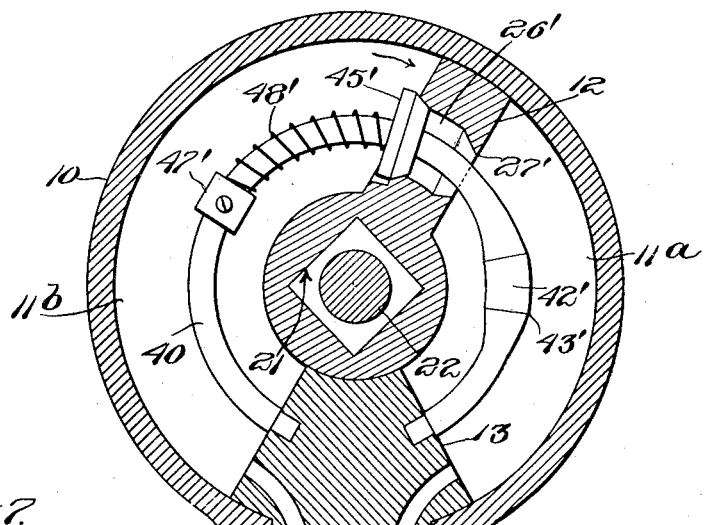
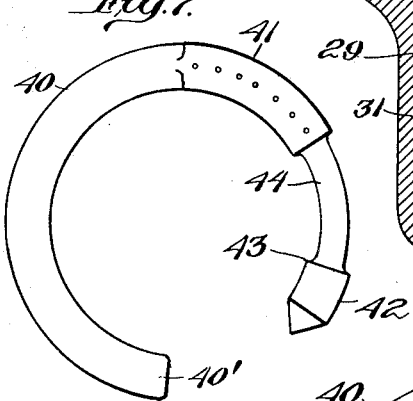
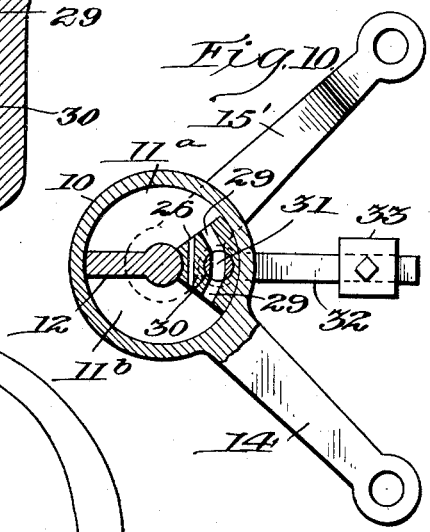
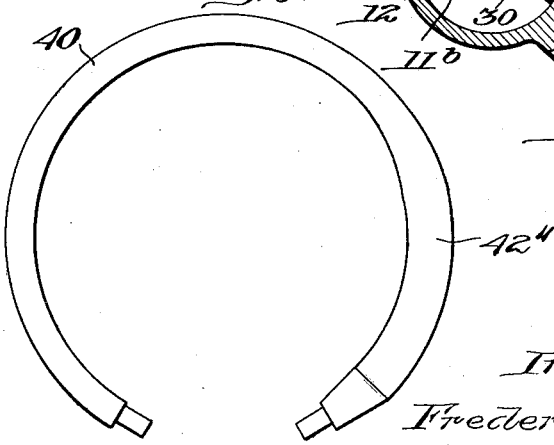

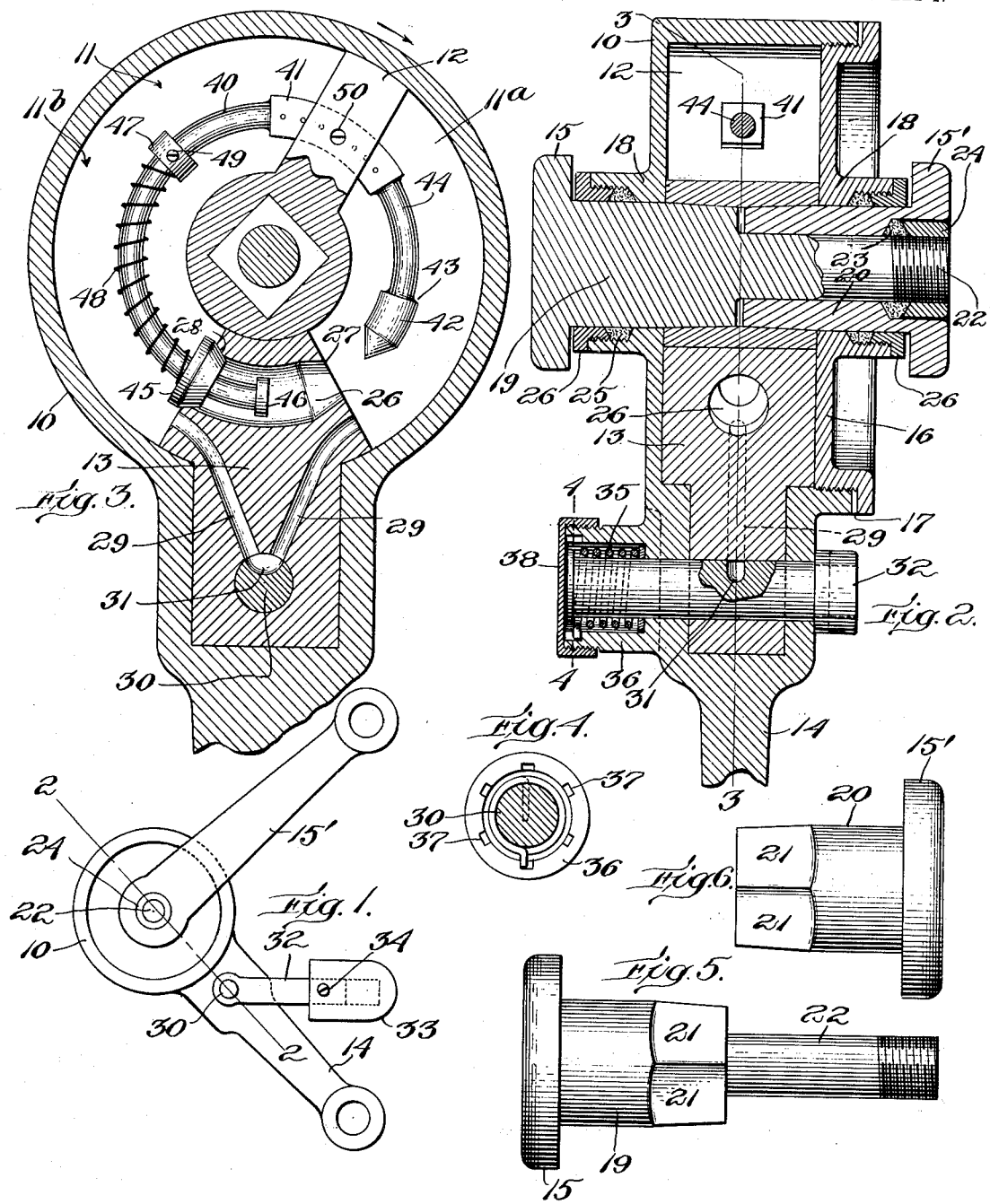

UNITED STATES PATENT OFFICE.

FREDERIK NIELSEN, OF BOSTON, MASSACHUSETTS.

SHOCK-ABSORBER.

1,016,514. Specification of Letters Patent. Patented Feb. 6, 1912.

Application filed October 15, 1910. Serial No. 587,208.

*To all whom it may concern:*

Be it known that I, FREDERIK NIELSEN, of Boston, in the county of Suffolk and State of Massachusetts, have invented certain new and useful Improvements in Shock-Absorbers, of which the following is a specification.

The object of the present invention is to provide an improved shock absorber of the type commonly employed in connection with motor vehicles.

One requisite of a shock absorber is that it shall not retard the rise and fall of the vehicle body when the vehicle is running upon comparatively smooth roads, because free movement of the body to a limited extent is desirable under normal conditions. But when the vehicle encounters a relatively large obstacle or relatively deep depression which would cause great relative movement of the running gear and body of the vehicle, it is desirable to oppose such movement, not only for the comfort of the passengers, but also to protect the springs against liability of becoming broken as the result of great compression and recoil. It is also desirable that the shock absorber be of a type adapted to oppose such movement with increasing resistance for additional increments of compression of the vehicle springs.

The device forming the subject of the present invention embodies features which satisfy the aforesaid requirements. The device is designed to employ a liquid cushioning medium in a casing having a closed chamber and a piston, the casing and piston being connected one to the body and the other to the running gear. A by-pass is provided for the liquid, and is controlled by a valve which is automatically affected by the rise and fall of the car. The purpose of the by-pass and automatic valve is to permit the liquid cushioning medium to flow freely when the car is traveling under normal conditions over comparatively smooth roads, and to oppose the flow of liquid whenever the car is subjected to an unusual vertical movement so as to confine the cushioning fluid to a greater degree and thereby cause it to oppose vertical movement. Independently of the aforesaid valve, the cushioning fluid is controlled by relative movement of the compressing walls of the compressing chamber, a flow passage being formed in one of said walls, and valves being carried by the opposing wall so as to open and close the flow passage.

Of the accompanying drawings which show various forms in which the invention may be embodied: Figure 1 represents a side elevation of the complete device. Fig. 2 represents a section on line 2—2 of Fig. 1. Fig. 3 represents a section on line 3—3 of Fig. 2. Fig. 4 represents a section on line 4—4 of Fig. 2. Fig. 5 represents an elevation of one of two complemental members by which the piston is moved. Fig. 6 represents an elevation of the other of said complemental members. Fig. 7 is an elevation of an arcuate valve adapted to be substituted for that shown in Figs. 2 and 3. Fig. 8 represents a section similar to Fig. 3, including controlling means of different construction. Fig. 9 represents an arcuate valve adapted to be substituted for that shown in Fig. 7. Fig. 10 represents a vertical section of a shock absorber controlled solely by a valve of the weighted balance type.

The same reference characters indicate the same parts wherever they occur.

The device comprises a casing 10 in which is formed a cylindric chamber 11. An oscillatory piston 12 is arranged in the chamber 11 to coöperate with an abutment 13 fixed to the casing. Oil, glycerin or other fluid may be employed as the cushioning medium between the piston and abutment. The casing 10 and piston 12 are connected one with the running gear and the other with the body of the vehicle so as to cause oscillation of the piston with relation to the casing, or vice versa. For this reason the casing is provided with an arm 14 for connecting it with either the running gear or body, and the piston is provided with arms 15 and 15' for connecting it with the other element of the vehicle. The manner of connecting the arms 15 and 15' with the piston is hereinafter explained. One side wall 16 of the casing 10 is removable, and, as shown by Fig. 2, is screw-threaded with the main portion of the casing. A gasket 17 is provided for making the joint tight. The wall 16 and the opposite side wall are formed with central bosses 18 which afford bearings for a cylindric stud 19 and sleeve 20. (See Figs. 2, 5 and 6). The stud 19, as here shown, is formed upon the arm 15, and the sleeve 20, as shown, is formed upon the arm 15'. The stud 19 is formed with angular faces 21 and with a screw-threaded extension 22. The sleeve 20 is likewise formed with angular faces 21, and its central bore is adapted to receive the screw-threaded extension 22. The outer end of the sleeve 20 is counterbored as indicated at 23, and is internally screw-threaded for the purpose of affording a stuffing box to receive packing material and a gland 24. The gland is threaded to engage the extension 22 and is therefore adapted to not only compress the packing material in the stuffing box but to draw the stud 19 toward the sleeve. The angular faces 21 of the stud and sleeve converge slightly, and the hub of the piston 12 is formed with an angular hole of which the surfaces are formed to be engaged by the faces 21. The angular faces of the piston converge in accordance with the faces 21, so that when the stud 19 and sleeve 20 are drawn together in the hub they are tightly wedged therein and are fixed with relation to the piston. The bosses 18 in which the stud 19 and sleeve 20 are journaled are also formed with stuffing boxes to receive packing material, indicated at 25. Glands 26 are screw-threaded in the outer ends of the bosses 18 and afford additional bearings for the stud and sleeve.

The piston 12 and the abutment 13 are, of course, as wide as the chamber 11, the piston, however, being freely movable in engagement with the opposite side walls and the interior cylindric surface of the casing. A free passage 26 extends through the abutment 13, and is provided for permitting the cushioning fluid to flow from one side of the abutment to the other. One end of the flow passage is preferably contracted, as indicated at 27, and the abutment at the other end of the flow passage constitutes a valve seat, indicated at 28. The passage 26 may be regarded as the main flow passage, because the abutment 13 is provided with a by-pass comprising two ducts 29, 29. The ducts 29 do not communicate directly with each other, but they both extend to an oscillatory plug valve 30, which is provided with a port or flow passage 31, which, as shown by Fig. 3 is adapted to form communication between the two ducts. With the valve 30 in the position shown, the cushioning fluid may flow from one side of the abutment to the other. The main flow passage 26 is controlled solely by movement of the piston 12, and the by-pass is controlled independently of the piston 12. As shown by Figs. 1 and 2, the valve extends through the walls of the casing and is provided with an arm 32 outside the casing. The arm (see Fig. 1) is provided with a weight 33 which is radially adjustable. A screw 34 threaded in the weight is adapted to engage the arm 32 to fix the weight at the desired position on the arm. The other end of the valve is engaged by a spring 35, one end of the spring being inserted in a hole in the valve and the other end being bent outwardly. The spring is contained in a chamber in a boss 36, and the interior wall of the boss is formed with a plurality of pockets 37, any one of which may receive the outer end of the spring. A cap 38 is screw-threaded on the boss 36 to inclose the end of the valve and the spring and to prevent the leakage of such cushioning fluid as might otherwise leak between the valve and the casing. The piston carries an arcuate rod 40, the arc of the rod being concentric with relation to the axis of oscillation. The rod is formed with an angular portion 41 which extends through a hole of similar cross section in the piston. One end of the rod is formed with a head 42 which constitutes a valve, the extremity of the head being preferably tapered. Between the shoulder 43 and the angular portion 41 the rod is reduced in size, as indicated at 44. A valve 45 is mounted on the rod near the other end, this valve being adapted to slide along the rod. That end of the rod is provided with a collar 46 for preventing the valve 45 from sliding off the end of the rod. The collar 47 is placed upon the rod between the valve 45 and the angular portion 41, and a helical spring 48 is placed upon the rod between the valve 45 and the collar 47. The collar 47 is provided with a setscrew 49 by which it may be affixed to the rod at various positions. The collar 47 is preferably placed so as to slightly compress the spring 48 when the valve 45 is against the collar 46. As shown by Fig. 3, the spring is further compressed by the valve which is seated upon its valve seat 28, although the collar 46 is somewhat distant from the valve. The collar 46 is arranged to move through the main flow passage 26, the diameter of the collar being slightly less than the contracted end 27 of the flow passage. The diameter of the valve 42 is likewise slightly less than the contracted end 27 of the flow passage, the difference in diameter being only as much as required to enable the valve to enter the flow passage without binding in the end 27. The rod 40 and all the elements carried by it may be adjusted with relation to the piston 12 by moving the angular portion 41 back or forth in the piston. The piston is provided with a setscrew 50 which is adapted to engage the portion 41 and hold it securely at the desired position. The purpose of the angular portion 41 and the complemental angular faces of the piston is to preserve the desired relation of the valves 42, 45 and the flow passage 26.

The free ends of the arms 14, 15 and 15' are provided with holes for the reception of pivot studs for connecting them to the running gear and body of the vehicle. When the device is attached to the vehicle, it stands in the position shown by Fig. 1. In this connection, it will be observed that the weighted arm 32 extends in a substantially horizontal plane.

For the purpose of describing the operation of the device, it may facilitate an understanding if the two divisions of the chamber 11 on opposite sides of the piston and abutment are indicated by different reference characters. For this reason one division is indicated at 11$^a$ and the other at 11$^b$. The various elements described are arranged to effect clockwise movement of the piston when the vehicle springs are being compressed, and to effect counter clockwise movement when the vehicle springs are being distended. The piston will move in the direction of the arrow in Fig. 3 during downward movement of the vehicle body, or upward movement of the running gear, which is equivalent to downward movement of the body. The position of the parts as shown by Fig. 3 may be regarded as corresponding to the normal position of the body, as when the vehicle springs are compressed to the normal degree. Under these conditions, when the car is running on a comparatively smooth road, the piston may move back and forth within a short range of movement without causing the valve 42 to enter the main passage 26 and without causing the collar 46 to move the valve 45 from its seat 28. Furthermore, under normal conditions, the weighted arm 32 is balanced by the spring 35 so that the port 31 permits flow of the cushioning fluid back and forth between the chambers 11$^a$ and 11$^b$. Slight upward and downward movements of the running gear are therefore not opposed by the shock absorber, because the cushioning fluid may pass back and forth freely from one side of the piston to the other. When the vehicle encounters an unusually large obstacle, the result is that the running gear is first thrust violently upward. This compresses the vehicle springs, causes the piston 12 to move in the direction of the arrow in Fig. 3, and causes the closing of the by-pass valve because of the inertia of the weighted arm 32. The weighted arm eventually moves upward with the shock absorber, but it lags sufficiently to keep the by-pass valve closed until the running gear descends. The by-pass valve is in the meantime subject to the tension of its spring 35, and the weighted arm springs upwardly when the shock absorber subsequently moves downwardly. The by-pass valve is momentarily opened when it resumes its normal position, but as the shock absorber continues to move downward and the weighted arm is moved upwardly, the by-pass valve immediately closes again. This valve is therefore sufficiently behind the movements of the shock absorber to keep the by-pass closed except at the instant when the port 31 passes across the ends of the ducts 29.

The shock absorber is moved upwardly and downwardly, not only by movement of the running gear but by movement of the vehicle body, and it is therefore immaterial which of these two elements is in motion so far as the operation of the weighted valve is concerned.

The weighted valve is always free and may oscillate during all undue jouncing of the car, thus obstructing more or less, and at times completely obstructing, the by-pass. The principal function of the by-pass and balanced valve is to afford free rise and fall of the body under normal conditions, because, as stated, it is desirable to not retard the resilient movement of the vehicle springs except when the vehicle encounters an unusually large obstacle or depression. The provision of the by-pass and balanced valve therefore renders the shock absorber entirely passive when the vehicle is running on a comparatively smooth road; but as soon as the vehicle begins jouncing, and until it stops jouncing, the by-pass is nearly if not entirely closed, because the balanced valve will continue to vibrate until the car stops jouncing.

The arcuate valve shown by Fig. 7 is adapted to be substituted for that shown in Figs. 2 and 3. This form of valve is the same as that described with regard to the rod portion 40, angular portion 41, head 42, shoulder 43 and reduced portion 44. It differs, however, in that it is not provided with any collar at its other end nor with any spring-pressed valve such as the valve 45. The end 40' occupies the same relative position as the collar 46, the diameter of the end 40' being the same as that of the head 42, so that it is adapted to pass through the contracted end 27 of the main passage, but at the same time to substantially close the passage. This form of valve, like the form first described, also acts to prevent the escape of cushioning fluid through the chamber 11$^b$ when the recoil of the vehicle springs causes the piston to move in the direction opposite the arrow in Fig. 3.

In the form shown by Fig. 8, the interior of the casing 10 is divided into two chambers 11$^a$ and 11$^b$, the same as the form shown by Fig. 3. The arcuate valve, however, instead of being fixed with relation to the piston 12 is fixed with relation to the abutment 13, and the main flow passage for the cushioning fluid is formed in the piston instead of in the abutment. In this form the flow passage is indicated at 26', and the contracted end thereof is indicated at 27'. The ends of the arcuate valve are set into the abutment 13, and the valve, which is throughout most of its length considerably smaller than the diameter of the contracted end 27', has an enlarged portion 42' which substantially closes the opening 27' when the piston moves in the direction of the arrow. The valve is reduced in diameter between the shoulder 43' and the abutment 13, with the result that when the piston moves beyond the shoulder 43' the reduced portion of the valve permits the cushioning fluid to escape back through the passage 26. The valve rod is provided with a spring-actuated valve 45' which acts precisely in the same manner as the valve 45 of Fig. 3 in closing the main flow passage 26'. The spring for the valve 45' is indicated at 48', and the collar for the spring is indicated at 47'. The abutment 13 is provided with by-pass ducts 29 and the weighted valve 30 in all respects like those of Fig. 3.

The arcuate valve shown by Fig. 9 is adapted to be substituted for that included in Fig. 8. The essential difference in the form shown by Fig. 9 is that the enlarged portion 42" extends through a relatively long arc and is adapted to retard the flow through the passage 26' for a longer period of time.

I claim:

1. A shock absorber comprising coöperative elements forming a chamber, one of said elements having a flow passage for the escape of a cushioning fluid from said chamber, and a valve for controlling said flow passage, said valve being balanced as to gravity whereby it is automatically opened and closed as the result of vertical movement of said elements.

2. A shock absorber comprising coöperative elements forming a chamber, one of said elements having a flow passage for the escape of a cushioning fluid from said chamber, a valve for controlling said flow passage, a weight for moving the valve in one direction, and spring tension means for counteracting said weight, said weight being arranged to cause said valve to open and close automatically as the result of vertical movement of said elements.

3. A shock absorber comprising a casing having a closed chamber, coactive relatively movable elements therein for acting upon a cushioning fluid, said elements dividing said chamber into two smaller chambers, one of said elements having a passage in open communication with both of said smaller chambers, a spring-actuated valve for controlling the flow through said passage, and a weight attached to said valve to balance the same, whereby the valve is opened and closed by movement of the casing.

4. A shock absorber comprising relatively movable elements forming a chamber, said elements being adapted to act upon a fluid in said chamber with varying pressure, one of said elements having an opening for the escape of fluid from said chamber, and a member projecting from the other of said elements so as to move into and entirely out of said opening to control the flow therethrough, said member having a tapering portion the larger end of which is toward said opening, the coöperative wall of said opening being relatively short to enable the larger end of said tapering portion to pass entirely through and beyond it.

5. A shock absorber comprising a casing having a closed cylindric chamber, two relatively movable members therein dividing said chamber into two smaller chambers, one of said members being fixed to the casing and the other being mounted to oscillate therein to act upon a fluid in one or the other of said smaller chambers, one of said members having a concentric flow passage through which the fluid may pass from one to the other of said smaller chambers, a valve seat at one end of said flow passage, an arcuate member affixed to the other of said members and arranged concentrically so as to move into and out of said passage, a valve arranged to slide on said arcuate member, said valve being adapted to coact with said valve seat, and spring tension means for seating said valve.

6. A shock absorber comprising a casing having a chamber, means in said chamber for acting upon a fluid, one of the walls of the chamber having a flow passage for the escape of fluid, and a weighted valve adapted to be actuated by movement of the casing for controlling the escape of fluid through said passage.

7. A shock absorber comprising means forming a chamber, said means consisting of relatively movable members adapted to act upon a fluid in said chamber, and having two openings for the flow of fluid to and from said chamber, independent valves for said openings, one of said valves being carried toward and from its opening by one of said relatively movable members, the other of said valves being weighted, and spring tension means acting on said weighted valve to operate the same, said weighted valve being so balanced as to be operated by vertical movement to open and close its respective opening.

8. A shock absorber comprising coactive abutments for acting upon a cushioning fluid in a closed chamber, means for causing relative movement of said abutments, a relief passage extending through one of said abutments, and a valve arranged to control said passage, said valve being weighted so as to stand normally in a predetermined position and to be operated by inertia and momentum when moved bodily.

9. A shock absorber comprising a casing having a closed chamber, means dividing said chamber into two smaller chambers, means for causing relative movement of the said dividing means and casing to act upon a cushioning fluid, a passage for conducting the cushioning fluid back and forth from one of said smaller chambers to the other, an oscillatory valve fitted to turn in a bearing intermediate of said passage and having a port movable into and out of register with said passage, yielding means acting on said valve to normally turn it in one direction, and a weight acting on said valve to normally turn it in the opposite direction, said yielding means and weight being adapted to counteract each other to normally position said valve so that said port will register with said passage.

In testimony whereof I have affixed my signature, in presence of two witnesses.

FREDERIK NIELSEN.

Witnesses:
W. P. ABELL,
P. W. PEZZETTI.